US011995714B1

(12) United States Patent
Ding et al.

(10) Patent No.: US 11,995,714 B1
(45) Date of Patent: May 28, 2024

(54) MACHINE LEARNING-BASED LOSS FORECASTING MODEL

(71) Applicant: STRIPE, INC., San Francisco, CA (US)

(72) Inventors: Mengjie Ding, New York, NY (US); Bo Xu, Dublin, CA (US); Yaakov Erlichman, Teaneck, NJ (US)

(73) Assignee: STRIPE, INC., South San Francisco, CA (US)

( * ) Notice: Subject to any disclaimer, the term of this patent is extended or adjusted under 35 U.S.C. 154(b) by 118 days.

(21) Appl. No.: 17/475,215

(22) Filed: Sep. 14, 2021

(51) Int. Cl.
*G06Q 40/03* (2023.01)
*G06Q 40/06* (2012.01)

(52) U.S. Cl.
CPC .............. *G06Q 40/03* (2023.01); *G06Q 40/06* (2013.01)

(58) Field of Classification Search
None
See application file for complete search history.

(56) References Cited

U.S. PATENT DOCUMENTS

| 7,933,796 | B1 * | 4/2011 | Buist, III | G06Q 40/03 705/36 R |
|---|---|---|---|---|
| 2002/0198835 | A1 * | 12/2002 | Watson | G06Q 40/03 705/40 |
| 2004/0030629 | A1 * | 2/2004 | Freeman | G06Q 40/03 705/36 R |
| 2011/0016042 | A1 * | 1/2011 | Cho | G06Q 40/08 705/38 |
| 2011/0184777 | A1 * | 7/2011 | Shao | G06Q 30/0202 705/7.31 |
| 2018/0225605 | A1 * | 8/2018 | Fabara | G06Q 10/0635 |
| 2019/0266516 | A1 * | 8/2019 | Olabiyi | G08G 1/0112 |
| 2020/0104843 | A1 * | 4/2020 | Bhasin | G06Q 20/4015 |
| 2022/0414763 | A1 * | 12/2022 | Singla | G06Q 40/03 |

FOREIGN PATENT DOCUMENTS

WO    WO-2020111376 A1 *  6/2020  ............. G06N 20/00

OTHER PUBLICATIONS

Dressler, J. B., & Tauer, L. W. (2016). Estimating expected and unexpected losses for agricultural mortgage portfolios. American Journal of Agricultural Economics, 98(5), 1470-1485. doi:http://dx.doi.org/10.1093/ajae/aaw049 on Sep. 15, 2023 (Year: 2016).*

* cited by examiner

*Primary Examiner* — Kito R Robinson
(74) *Attorney, Agent, or Firm* — Womble Bond Dickinson (US) LLP

(57) ABSTRACT

Systems and methods for implementing a machine learning loan portfolio loss forecasting system are provided. A current state of active loans of a loan portfolio during a first time period of a set of time periods may be determined. For each of the set of time periods, a roll rate of the active loans from each delinquency state to a subsequent delinquency state may be determined based on historical data of the loan portfolio. The machine learning model may then, iteratively, for each subsequent time period, determine a percentage of the active loans that will transition to each of the set of delinquency states during the subsequent time period based on a current state of the active loans during a previous time period and the roll rate from each delinquency state to a subsequent delinquency state for the subsequent time period.

20 Claims, 9 Drawing Sheets

% Origination Amount in Each State

| Days on Book | FPD | Clean | 30DNP | 60DNP | 90DNP | 120DNP | 150DNP | 180DNP |
|---|---|---|---|---|---|---|---|---|
| 0 | 0% | 100% | 0% | 0% | 0% | 0% | 0% | 0% |
| 30 | 10% | 90% | 0% | 0% | 0% | 0% | 0% | 0% |
| 60 | 21% | 77% | 2% | 0% | 0% | 0% | 0% | 0% |

*FIG. 4*

| Roll Rate Transition Matrix from 60-Day on Book to 90-Day on Book | | | | | | | | |
|---|---|---|---|---|---|---|---|---|
| | FPD | Clean | 30DNP | 60DNP | 90DNP | 120DNP | 150DNP | 180DNP |
| FPD | 100% | 0% | 0% | 0% | 0% | 0% | 0% | 0% |
| Clean | 13% | 86% | 1% | 0% | 0% | 0% | 0% | 0% |
| 30DNP | 0% | 52% | 0% | 48% | 0% | 0% | 0% | 0% |
| 60DNP | 0% | 30% | 0% | 0% | 70% | 0% | 0% | 0% |
| 90DNP | 0% | 5% | 0% | 0% | 0% | 95% | 0% | 0% |
| 120DNP | 0% | 9% | 0% | 0% | 0% | 0% | 91% | 0% |
| 150DNP | 0% | 10% | 0% | 0% | 0% | 0% | 0% | 90% |
| 180DNP | 0% | 0% | 0% | 0% | 0% | 0% | 0% | 100% |

*FIG. 5*

% Origination Amount in Each State

| Days on Book | FPD | Clean | 30DNP | 60DNP | 90DNP | 120DNP | 150DNP | 180DNP |
|---|---|---|---|---|---|---|---|---|
| 0 | 0% | 100% | 0% | 0% | 0% | 0% | 0% | 0% |
| 30 | 10% | 90% | 0% | 0% | 0% | 0% | 0% | 0% |
| 60 | 21% | 77% | 2% | 0% | 0% | 0% | 0% | 0% |
| 90 | 31% | 67% | 1% | 1% | 1% | 0% | 0% | 0% |

FIG. 6

MACHINE LEARNING-BASED LOSS FORECASTING MODEL

BACKGROUND

Merchants, such as on-line retailers, brick and mortar retailers, service providers, etc., provide their products and services to consumers in a variety of ways. One way of providing their products and services includes providing them directly to consumers through, for example, an online platform associated with the merchant. An online platform of a merchant can provide a marketplace for digital services consumed by a consumer. One example of such services may be loan origination, wherein the merchant provides loans to a consumer. To this end, merchant's online platform may provide loan transaction processing and other functionality.

Whenever a merchant originates a new loan, a reserve of cash must be set aside in anticipation of a loss on the loan. Therefore, it is important to accurately predict future losses stemming from a loan portfolio for a variety of business purposes.

BRIEF DESCRIPTION OF THE DRAWINGS

The present disclosure will be understood more fully from the detailed description given below and from the accompanying drawings of various embodiments, which, however, should not be taken to limit the embodiments described and illustrated herein, but are for explanation and understanding only.

FIG. 4 illustrates an example breakdown of the active loans in a loan portfolio into each of the set of delinquency states illustrated in FIG. 3, for certain time periods of a set of time periods during which active loans are on-book, in accordance with some embodiments of the present disclosure.

FIG. 5 illustrates a roll rate transition matrix for one of the set of time periods during which active loans are on-book, in accordance with some embodiments of the present disclosure.

FIG. 6 illustrates a breakdown of the active loans in a loan portfolio into each of the set of delinquency states illustrated in FIG. 3, for certain time periods of a set of time periods, including a time period in which the breakdown is derived by the machine learning model of FIG. 1A, in accordance with some embodiments of the present disclosure

DETAILED DESCRIPTION

Figure 1A:
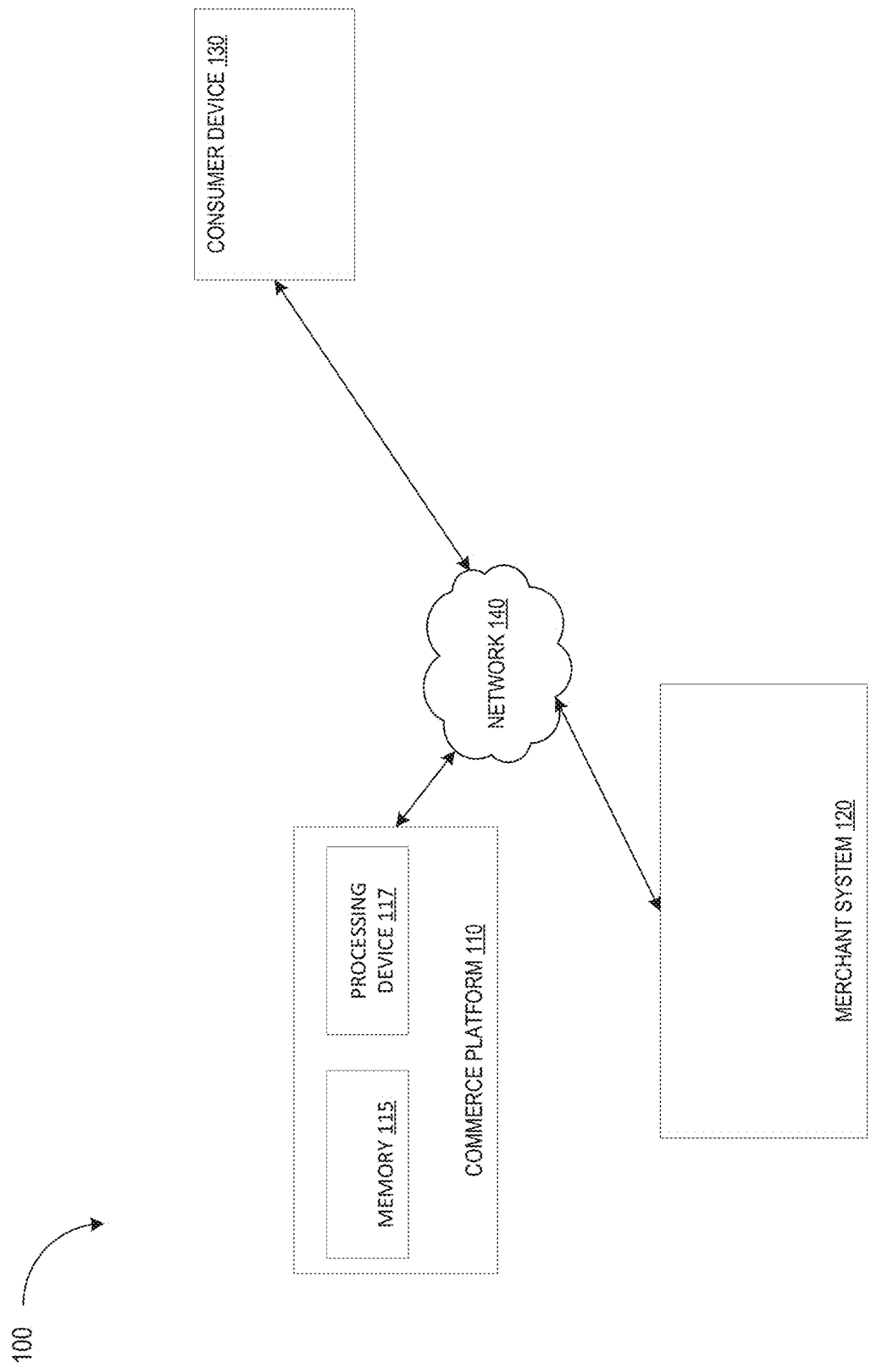
FIG. 1A is a high level block diagram of an exemplary system architecture for providing and implementing a machine learning loan portfolio loss forecasting system, in accordance with some embodiments of the present disclosure.

The present disclosure is directed to systems and methods for providing and implementing a machine learning loan portfolio loss forecasting system. The system may implement a machine learning model that uses roll rate analysis with adjustments for current macroeconomic conditions to predict expected losses in a loan portfolio. By avoiding the use of payment rates to compute roll rates, the machine learning loss forecasting system is applicable to merchant cash advances (MCA). The machine learning model may use a cohort-based approach to calculate roll rates, and may adjust the roll rates for current macroeconomic conditions to ensure accurate loss prediction.

In an exemplary embodiment, a method for implementing a machine learning loan portfolio loss forecasting system is provided. The method may comprise: determining a current state of active loans of a loan portfolio during a first time period of a set of time periods, wherein the current state indicates a delinquency state of a set of delinquency states that each active loan in the loan portfolio falls into. For each of the set of time periods, a roll rate of the active loans from each delinquency state to a subsequent delinquency state may be determined based on historical data of the loan portfolio. A machine learning model may be used to determine a percentage of the active loans that will transition to each of the set of delinquency states during a second time period of the set of time periods based on the current state of the active loans of the loan portfolio and the roll rate from each delinquency state to a subsequent delinquency state for the second time period. The machine learning model may then, iteratively, for each subsequent time period, determine a percentage of the active loans that will transition to each of the set of delinquency states during the subsequent time period based on a current state of the active loans during a previous time period and the roll rate from each delinquency state to a subsequent delinquency state for the subsequent time period.

In another embodiment, a commerce platform is provided. The commerce platform may comprise a memory and a processor coupled with the memory. The processor may be configured to determine a current state of active loans of a loan portfolio during a first time period of a set of time periods, wherein the current state indicates a delinquency state of a set of delinquency states that each active loan in the loan portfolio falls into. For each of the set of time periods, the processor may determine a roll rate of the active loans from each delinquency state to a subsequent delinquency state based on historical data of the loan portfolio. The processor may utilize a machine learning model to determine a percentage of the active loans that will transition to each of the set of delinquency states during a second time period of the set of time periods based on the current state of the active loans of the loan portfolio and the roll rate from each delinquency state to a subsequent delinquency state for the second time period. The processor may then utilize the machine learning model to, iteratively, for each subsequent time period, determine a percentage of the active loans that will transition to each of the set of delinquency states during the subsequent time period based on a current state of the active loans during a previous time period and the roll rate from each delinquency state to a subsequent delinquency state for the subsequent time period.

In the following description, numerous details are set forth. It will be apparent, however, to one of ordinary skill in the art having the benefit of this disclosure, that the embodiments described herein may be practiced without these specific details. In some instances, well-known structures and devices are shown in block diagram form, rather than in detail, in order to avoid obscuring the embodiments described herein.

Some portions of the detailed description that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "configuring," "receiving", "generating", "transmitting", "processing", "providing", "determining", "accessing", "entering", "utilizing", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The embodiments discussed herein may also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the embodiments discussed herein are not described with reference to any particular programming language. It will be appreciated that a variety of programming languages may be used to implement the teachings as described herein.

FIG. 1A is a high level block diagram of an exemplary system 100 for providing and implementing a machine learning loan portfolio loss forecasting system. As illustrated in FIG. 1A, the system 100 may include commerce platform 110, merchant system 120, and consumer device 130. The commerce platform 110, merchant system 120, and consumer device 130 may be coupled to a network 140 and communicate with one another using any of the standard protocols for the exchange of information. Network 140 may be a public network (e.g., the internet), a private network (e.g., a local area network (LAN) or wide area network (WAN)), or a combination thereof. In one embodiment, network 140 may include a wired or a wireless infrastructure, which may be provided by one or more wireless communications systems, such as a WiFi™ hotspot connected with the network 140 and/or a wireless carrier system that can be implemented using various data processing equipment, communication towers (e.g. cell towers), etc. The network 140 may carry communications (e.g., data, message, packets, frames, etc.) between computing devices 110, 120, and 130. In one embodiment, one or more of the commerce platform 110, merchant system 120, and consumer device 130 may run on one Local Area Network (LAN) and may be incorporated into the same physical or logical system, or different physical or logical systems. Alternatively, the commerce platform 110, merchant system 120, and consumer device 130 may reside on different LANs, wide area networks, cellular telephone networks, etc. that may be coupled together via the Internet but separated by firewalls, routers, and/or other network devices. In one embodiment, commerce platform 110 may reside on a single server, or be distributed among different servers, coupled to other devices via a public network (e.g., the Internet) or a private network (e.g., LAN). It should be noted that various other network configurations can be used including, for example, hosted configurations, distributed configurations, centralized configurations, etc.

Each of the commerce platform 110, merchant system 120, and consumer device 130 may include hardware such as processing device 117 (e.g., processors, central processing units (CPUs)), memory 115 (e.g., random access memory (RAM), storage devices (e.g., hard-disk drive (HDD)), and solid-state drives (SSD), etc.), and other hardware devices (e.g., sound card, video card, etc.). A storage device may comprise a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each of the commerce platform 110, merchant system 120, and consumer device 130 may comprise any suitable type of computing device or machine that has a programmable processor including, for example, server computers, desktop computers, laptop computers, tablet computers, smartphones, set-top boxes, etc. In some embodiments, each of the commerce platform 110, merchant system 120, and consumer device 130 may comprise a single machine or may include multiple interconnected machines (e.g., multiple servers configured in a cluster). Each of the commerce platform 110, merchant system 120, and consumer device 130 may be implemented by a common entity/organization or may be implemented by different entities/organizations. Each of the commerce platform 110, merchant system 120, and consumer device 130 may each execute or include an operating system (OS—not shown), as discussed in more detail below. The OSs of each of the commerce platform 110, merchant system 120, and consumer device 130 may manage the execution of other components (e.g., software, applications, etc.) and/or may manage access to the hardware (e.g., processors, memory, storage devices etc.) of the computing device.

In one embodiment, the merchant system 120 provides a marketplace for digital services consumed by consumer device 130. One example of such services may be loan origination, wherein the merchant system 120 provides loans to a user of consumer device 130. To this end, the commerce platform 110 may provide loan transaction processing and other functionality on behalf of the merchant system 120 such as e.g., providing loss forecasting services, providing a portal from which a user of consumer device 130 can manage their loan account, link a bank account and make loan payments, request a payment deferment, or change/request to change the terms of the loan repayment. In some embodiments, the merchant system 120 may provide the loan transaction processing and other functionality described above on its own without using the commerce platform 110.

A loan portfolio starts with 100% of the loans in a state referred to as "clean," indicating that payments for the loan are current. Every loan may have a starting state of clean and as the portfolio ages, the loans in the portfolio gradually reach one of two terminal delinquency states: fully paid down (FPD) or 180 days of no payment (DNP). Once a loan has reached 180 DNP, the outstanding principle is considered to be a loss (also referred to herein as a charge-off). A loan may exist in any of a variety delinquency states on its way to a terminal delinquency state including e.g., FPD, clean, 30 DNP, 60 DNP, 90 DNP, 120 DNP, 150 DNP and 180 DNP. Although the threshold for charging-off a loan is described herein as 180 DNP, this is for ease of description only and any appropriate period of time may be used as the threshold for charging-off a loan. Similarly, although the various delinquency states corresponding to DNP are described herein as 30 day intervals over a 180-day period for ease of description, each delinquency state may comprise any appropriate number of days of non-payment, and there may be any appropriate number of delinquency states. When the merchant system 120 originates a new loan, it must set aside a loss reserve in anticipation of the loss on that loan. Embodiments of the present disclosure provide a system that implements a machine learning model for forecasting losses in a loan portfolio based on a number of factors.

Figure 1B:
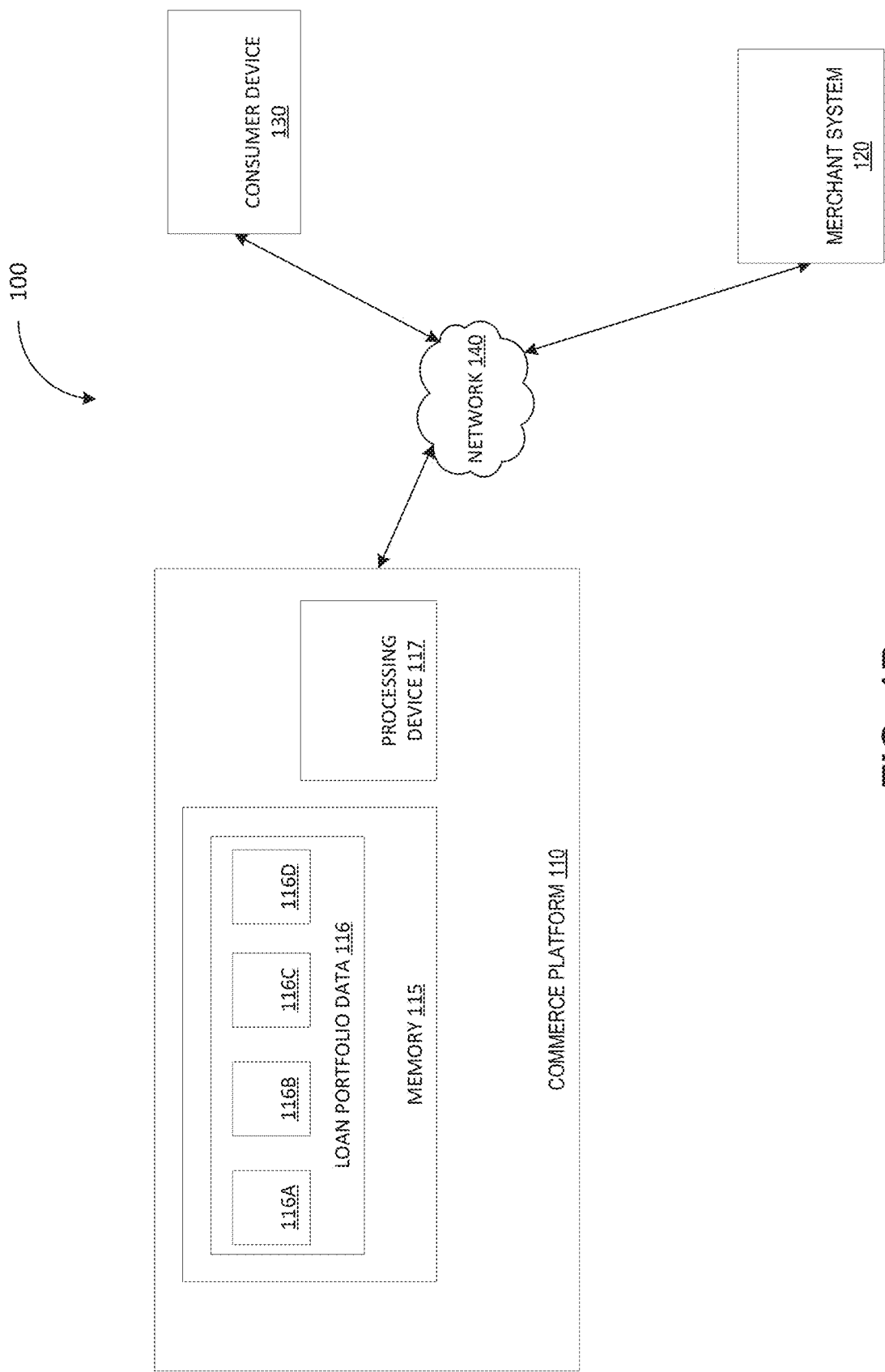
FIG. 1B is a high level block diagram of an exemplary system architecture for providing and implementing a machine learning loan portfolio loss forecasting system, in FIG. 2 is a block diagram illustrating the process of determining loan portfolio loss, in accordance with some embodiments of the present disclosure.

FIG. 1B illustrates the memory 115 of commerce platform 110, which may include loan portfolio data 116 including active loan data 116A and historical data 116B for a plurality of previously originated loans. This data may originate from merchant system 120 e.g., whenever the merchant system 120 originates a new loan. The historical data 116B may include data about all non-active loans (i.e., loans that have already reached their terminal delinquency state) in the loan portfolio, over any appropriate period of time (e.g., 3 years, 5 years, 10 years) or all non-active loans regardless of time period. The historical data 116B may indicate the percentage of loans that were ultimately FPD and the percentage that were charged-off, as well as how each of the non-active loans transitioned through various states of delinquency (if applicable) over a set of time periods that they were on-book. The amount of time a loan is "on-book" may refer to the amount of time that has elapsed since the loan was originated. The embodiments of the present disclosure are described with the on-book period being divided into a set of time periods that are 30 days each. However, it should be noted that 30 day intervals is by example only and the amount of time a loan is on book may be divided into time periods of any appropriate length.

The active loan data 116A may include information about each of the active loans (i.e., loans that have not yet reached their terminal delinquency state) in the loan portfolio including the total origination amount of all active loans in the loan portfolio, the amount (e.g., dollar value) of each active loan in the loan portfolio, an indication of how long each of the active loans in the current portfolio has existed (e.g., a date they were originated), and a current delinquency state (e.g. fully paid down, clean, 30 DNP, 60 DNP, 90 DNP, 120 DNP, 150 DNP and 180 DNP) of each active loan. The active loans may be divided into groups based on their month of origination (also referred to herein as monthly origination cohorts), and the embodiments of the present disclosure may generate a loss forecast for each monthly origination cohort of active loans. The memory 115 may also include a loss forecasting module 116C, which may be executed by processing device 117 in order to perform the functions described herein.

Figure 2:
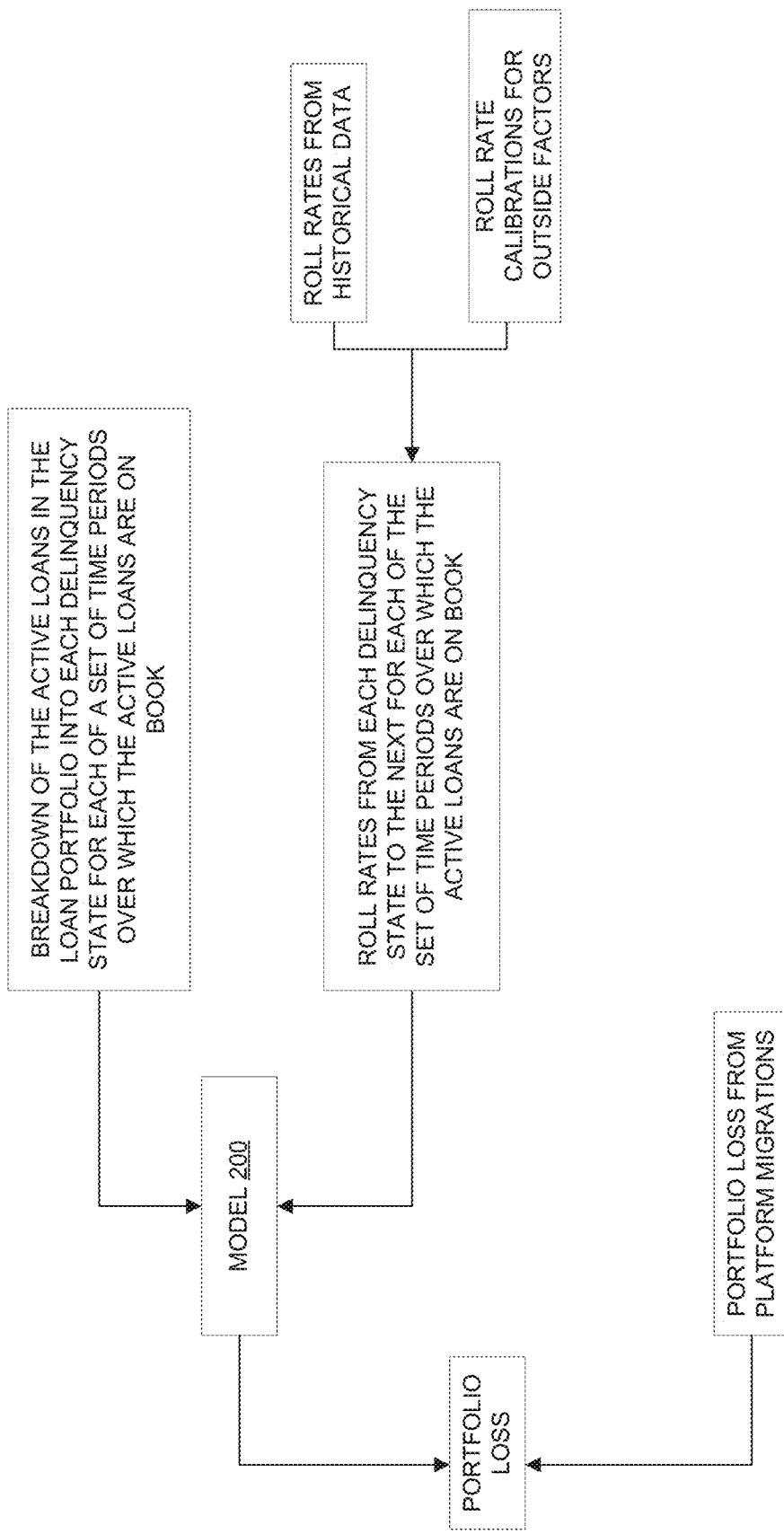

The primary component of the loss forecasting module 116C may be the loss forecasting model 200. FIG. 2 illustrates a data flow diagram of the process of forecasting loan portfolio loss using the machine learning model 200, in accordance with some embodiments of the present disclosure. Machine learning is well suited for continuous monitoring of one or multiple criteria to identify anomalies or trends, big and small, in input data as compared to training examples used to train the model. Thus, the loss forecasting model 200 may comprise any suitable machine learning model including by way of example and not limitation: Bayes, Markov, Gausian processes, clustering algorithms, generative models, kernel, and neural network algorithms. Some embodiments utilize a machine learning model based on a trained neural network (e.g., a trained recurrent neural network (RNN) or a trained convolution neural network (CNN)).

Figure 3:
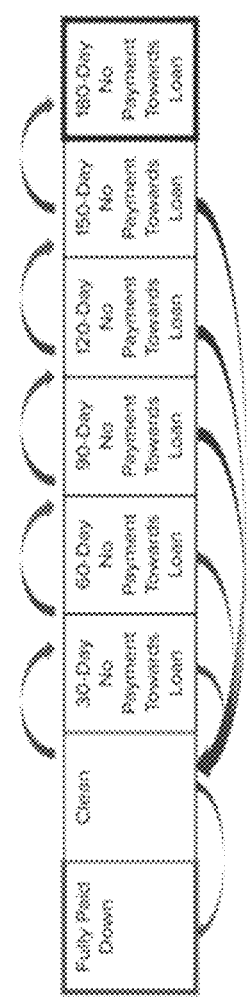
FIG. 3 is a diagram of a set of delinquency states, in accordance with some embodiments of the present disclosure.

The embodiments described herein may discuss the loss forecasting model 200 as a Markov model for ease of description, however any appropriate machine learning model (e.g., those mentioned hereinabove) may be used. The loss forecasting model 200 may be any appropriate Markov model such as e.g., a Markov chain. A Markov chain may be a stochastic model describing a sequence of possible events in which the probability of each event depends only on the state attained in the previous event. Thus, the loss forecasting model 200 may be a Markov chain implemented as a roll rate model for forecasting losses for each monthly origination cohort of active loans. A roll rate represents the probability of a loan transitioning from one delinquency state to another, as shown in the state diagram of FIG. 3. Each box represents a delinquency state, while each arrow represents the transition in a 30-day period, i.e. the transition from clean on date T to 30 DNP on date (T+30).

Referring back to FIG. 2, the loss forecasting model 200 may be mathematically represented as:

$$V_{i,T+30} = \sum_{k \in S} V_{k,T} P_{k,i,T}$$

Where $V_{i, T+30}$ is the dollar amount in state i on date (T+30); $V_{k, T}$ is the dollar amount in state k on date T; $P_{k, i, T}$ is the roll rate from state k on date T to state i on date (T+30); and S is the set of delinquency states, including fully paid down, clean, 30 DNP, 60 DNP, 90 DNP, 120 DNP, 150 DNP, and 180 DNP.

As can be seen in FIG. 2, the loss forecasting model 200 may receive 2 inputs: (1) the breakdown of the active loans in the loan portfolio into each delinquency state (e.g. fully paid down, clean, 30 DNP, 60 DNP, 90 DNP, 120 DNP, 150 DNP and 180 DNP), for each of the set of time periods over which the active loans are on-book (as discussed in further detail herein); and (2) roll rates from each delinquency state to the next (e.g. roll rate from clean to fully paid down, from clean to 30 DNP), for each of the set of time periods over which the active loans are on book (based on historical data 116B as discussed in further detail herein).

Initially, the processing device 117 may determine the breakdown of the active loans in the loan portfolio into each delinquency state during a current time period (also referred to herein as the "current state" of the active loans) based on the active loan data 116A. FIG. 4 illustrates an example breakdown of the active loans in the loan portfolio into each delinquency state, for each 30 days on book over a period of 90 days. As can be seen, after 30 days on book, 10% of the active loans have been FPD, while the remaining 90% are clean. However, once the active loans reach 60 days on book (the current time period in this example), 21% of the active loans have been FPD, 77% are clean, and 2% of the active loans are 30 DNP. It should be noted that at 60 days on-book, the processing device 117 does not know the breakdown of the active loans in the loan portfolio into each delinquency state for 120 days on book, 150 days on book etc. as these are future time periods, but will determine those breakdowns as discussed in further detail herein.

The processing device 117 may calculate the roll rates from each delinquency state to the next for every 30 days on book (second input to the model) using the historical data 116B. As discussed herein, the historical data 116B indicates how each of the non-active loans transitioned through the various delinquency states over each of the set of time periods that they were on book. The processing device 117 may calculate the roll rates from the 30 DNP delinquency state onward (e.g. 30 DNP to 60 DNP, 60 DNP to 90 DNP, 90 DNP to 120 DNP, 120 DNP to 150 DNP, and 150 DNP to 180 DNP) using all of the historical data 116B for every non-active loan. By contrast, the processing device 117 may calculate the roll rate from the clean delinquency state to the fully paid down (FPD) delinquency state for each of the set of time periods using a subset of the historical data 116B corresponding to non-active loans that were originated relatively recently. For example, the processing device 117 may calculate the roll rate from the clean delinquency state to the fully paid down (FPD) delinquency state for each of the set of time periods on-book using historical data corresponding to non-active loans that were originated during the first quarter (Q1) of the year 2019. That historical data would indicate how each of the non-active loans originated during the Q1 2019 transitioned through the various delinquency states over each of the set of time periods that they were on book.

The processing device 117 may calculate the roll rate from the clean delinquency state to the 30 DNP delinquency state using a subset of the historical data corresponding to a first cohort of loans with sufficient size and sufficient history. This is because the policy used to underwrite this cohort of loans is generally representative of the policy used to underwrite future loans. In the current example, the processing device 117 may use historical data corresponding to non-active loans that were originated during the first quarter (Q1) of the year 2019 for each of the set of time periods they were on-book with a max cap of 10%. The processing device 117 may use caps when calculating certain roll rates because the number of clean loans decrease in size as the number of days on book increases. For example, the roll rate from clean to 30 DNP calculated from actual performance data at 450 days on book is based on a small sample of loans. Roll rates calculated from a small size may be extremely high and not representative of the true roll rate and thus the use of max caps helps mitigate situations with extremely high roll rates which would otherwise over-state the loss rate. A max cap of 10% is chosen since (a) it is the average roll rate from clean to 30 DNP between 360 and 420 days on book for the Q1 2019 loan cohort, and (b) fits within an expected portfolio performance (e.g., the roll rate is not expected to exceed 10% in normal circumstances). Thus, since Q1 2019 has accumulated 480 days on book, the roll rate may be assumed to be no more than 10% after 480 days on book.

Roll rates from clean to 30D no payment for other origination cohorts use the scaled Q1 2019 roll rates for the next 90 days, and the Q1 2019 roll rates afterwards where each roll rate has a max cap of 10%. The scaler is determined as the ratio of past 90-day average roll rate for each origination cohort/average roll rate for the Q1 2020 origination cohort for the same 90 days on book, with a max cap of 200%.

The processing device 117 may calibrate the roll rate for one or more of the set of time periods on-book by using a multiplier to account for elevated delinquency and loss expectation due to outside factors. Examples of outside factors may be disease (e.g., COVID), economic conditions, and political/governmental factors, among others.

Upon calculating the roll rates from each delinquency state to the next for every 30 days on book, the processing device 117 (executing loss forecasting module 116C) may generate a roll rate transition matrix for every 30 days on book. FIG. 5 illustrates a roll rate transition matrix 500 for the period from 60 days on-book to 90 days on-book.

Given the current state of the portfolio (e.g., the breakdown of the active loans in the loan portfolio into each delinquency state at 60 days on-book—shown by the row encompassed by a bold line in FIG. 4) and the roll rate transition matrix from the 60 days on-book time period to the 90 days on-book time period (shown in FIG. 5), the processing device 117 may use the model 200 to determine the percentage of the active loans that will fall into each delinquency state during the next time period (i.e., 90 days on-book). Stated differently, the processing device 117 may use these inputs to determine the new current state of the active loans at 90 days on-book (i.e., the breakdown of the active loans in the loan portfolio into each delinquency state during the next time period of the set of time periods). The current state of the active loans at 90 days on-book is shown in FIG. 6 by the row encompassed by a dashed bold line.

Subsequently, the processing device 117 may use the current state of the active loans after 90 days on-book and the roll rate transition matrix (not shown) for the 90 days on-book time period to the 120 days on-book time period to determine what percentage of the active loans will fall into each delinquency state during the next time period of the set of time periods (i.e., the 120 days on-book time period). The processing device 117 may continue in this manner to determine what percentage of the active loans will transition into each delinquency state during each time period (e.g., next 30, 60, 90 . . . days etc.).

Based on the above determinations, the processing device 117 may then determine the percentage of active loans that will ultimately transition into the 180 DNP delinquency state during the time the active loans are on book, and determine a first component of the estimated portfolio loss based on the dollar value of the active loans that are predicted to transition into the 180 DNP delinquency state. As discussed above, in some embodiments the processing device 117 may perform the above steps for each monthly origination cohort and determine the percentage of active loans that will ultimately transition into the 180 DNP delinquency state during the time the active loans are on book for each monthly origination cohort.

The loan portfolio data 116 may also comprise portfolio migration data 116D corresponding to loans for consumers who have migrated to a different account type (referred to herein as "platform migrations"). For each of the monthly origination cohorts in the portfolio migration data 116D, the processing device 117 (executing loss forecasting module 116C) may assume that 100% of the remaining principal outstanding will be charged off on the days on book of the cohort as of current date, or 420 days on book, whichever occurs later. As shown in FIG. 2, the loss resulting from platform migrations may correspond to the second component of the estimated portfolio loss.

The final output of the loss forecasting module 116C may be a loss forecast table containing a loss forecast based on active loans (represented by active loan data 116A), a loss forecast based on platform migration, and an overall loss forecast. Each of the 3 loss forecasts may be expressed as e.g., a percentage of the total origination amount, for each monthly origination cohort and for each 30 days on book. The loss forecast table may be saved to memory 115. In some embodiments, the loss forecast table may be saved to a database storage system (not shown) such as Amazon™'s S3™ storage system.

The loss forecast table may also be transmitted to a cash reserve module 116D (shown in FIG. 1B), which may utilize the loss forecast table to instruct the merchant system 120 to adjust its cash reserve.

Figure 7:
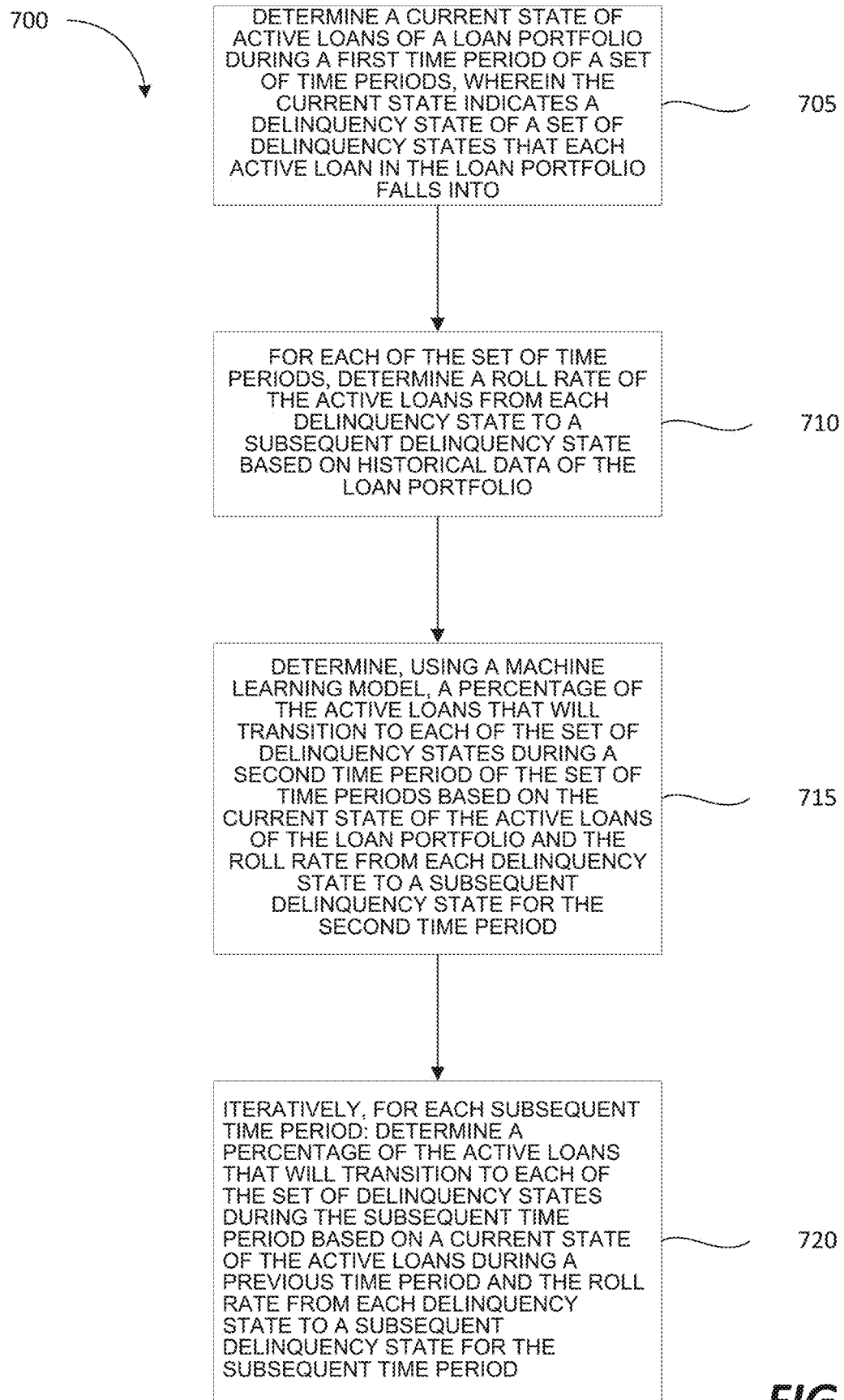
FIG. 7 is a flow diagram of a method for implementing a machine learning loan portfolio loss forecasting system, in accordance with some embodiments of the present disclosure.

FIG. 7 is a flow diagram of one embodiment of a method 700 for implementing a machine learning loan portfolio loss forecasting system. The method 700 is performed by processing logic that may comprise hardware (circuitry, dedicated logic, etc.), software (such as is run on a general purpose computer system or a dedicated machine), firmware, or a combination thereof. In one embodiment, the method 700 is performed by e.g., the commerce platform 110 illustrated in FIG. 1A.

Referring also to FIG. 2, the loss forecasting model 200 may receive 2 inputs: (1) the breakdown of the active loans in the loan portfolio into each delinquency state (e.g. fully paid down, clean, 30 DNP, 60 DNP, 90 DNP, 120 DNP, 150 DNP and 180 DNP), for each of the set of time periods over which the active loans are on-book (as discussed in further detail herein); and (2) roll rates from each delinquency state to the next (e.g. roll rate from clean to fully paid down, from clean to 30 DNP), for each of the set of time periods over which the active loans are on book (based on historical data 116B as discussed in further detail herein).

At block 705, the processing device 117 may determine the breakdown of the active loans in the loan portfolio into each delinquency state during a current time period (also referred to herein as the "current state" of the active loans) based on the active loan data 116A. FIG. 4 illustrates an example breakdown of the active loans in the loan portfolio into each delinquency state, for each 30 days on book over a period of 90 days. As can be seen, after 30 days on book, 10% of the active loans have been FPD, while the remaining 90% are clean. However, once the active loans reach 60 days on book (the current time period in this example), 21% of the active loans have been FPD, 77% are clean, and 2% of the active loans are 30 DNP. It should be noted that at 60 days on-book, the processing device 117 does not know the breakdown of the active loans in the loan portfolio into each delinquency state for 120 days on book, 150 days on book etc. as these are future time periods, but will determine those breakdowns as discussed in further detail herein.

At block 710, the processing device 117 may calculate the roll rates from each delinquency state to the next for every 30 days on book (second input to the model) using the historical data 116B. As discussed herein, the historical data 116B indicates how each of the non-active loans transitioned through the various delinquency states over each of the set of time periods that they were on book. The processing device 117 may calculate the roll rates from the 30 DNP delinquency state onward (e.g. 30 DNP to 60 DNP, 60 DNP to 90 DNP, 90 DNP to 120 DNP, 120 DNP to 150 DNP, and 150 DNP to 180 DNP) using all of the historical data 116B for every non-active loan. By contrast, the processing device 117 may calculate the roll rate from the clean delinquency state to the fully paid down (FPD) delinquency state for each of the set of time periods using a subset of the historical data 116B corresponding to non-active loans that were originated relatively recently. For example, the processing device 117 may calculate the roll rate from the clean delinquency state to the fully paid down (FPD) delinquency state for each of the set of time periods on-book using historical data corresponding to non-active loans that were originated during the first quarter (Q1) of the year 2019. That historical data would indicate how each of the non-active loans originated during the Q1 2019 transitioned through the various delinquency states over each of the set of time periods that they were on book.

The processing device 117 may calculate the roll rate from the clean delinquency state to the 30 DNP delinquency state using historical data corresponding to non-active loans that were originated during the first quarter (Q1) of the year 2019 for each of the set of time periods they were on-book with a max cap of 10%. Since Q1 2019 has accumulated 480 days on book, the roll rate may be assumed to be 10% after 480 days on book.

Roll rates from clean to 30D no payment for other origination cohorts use the scaled Q1 2019 roll rates for the next 90 days, and the Q1 2019 roll rates afterwards; each roll rate has a max cap of 10%. The scaler is determined as the ratio of past 90-day average roll rate for each origination cohort/average roll rate for the Q1 2020 origination cohort for the same 90 days on book, with a max cap of 200%.

The processing device 117 may calibrate the roll rate for one or more of the set of time periods on-book by using a multiplier to account for elevated delinquency and loss expectation due to outside factors. Examples of outside factors may be disease (e.g., COVID), economic conditions, and political/governmental factors, among others.

Upon calculating the roll rates from each delinquency state to the next for every 30 days on book, the processing device 117 (executing loss forecasting module 116C) may generate a roll rate transition matrix for every 30 days on book. FIG. 5 illustrates a roll rate transition matrix 500 for the period from 60 days on-book to 90 days on-book.

At block 715, given the current state of the portfolio (e.g., the breakdown of the active loans in the loan portfolio into each delinquency state at 60 days on-book—shown by the row encompassed by a bold line in FIG. 4) and the roll rate transition matrix from the 60 days on-book time period to the 90 days on-book time period (shown in FIG. 5), the processing device 117 may use the model 200 to determine the percentage of the active loans that will fall into each delinquency state during the next time period (i.e., 90 days on-book). Stated differently, the processing device 117 may use these inputs to determine the new current state of the active loans at 90 days on-book (i.e., the breakdown of the active loans in the loan portfolio into each delinquency state during the next time period of the set of time periods). The current state of the active loans at 90 days on-book is shown in FIG. 6 by the row encompassed by a dashed bold line.

Subsequently, at block 720 the processing device 117 may use the current state of the active loans after 90 days on-book and the roll rate transition matrix (not shown) for the 90 days on-book time period to the 120 days on-book time period to determine what percentage of the active loans will fall into each delinquency state during the next time period of the set of time periods (i.e., the 120 days on-book time period). The processing device 117 may continue in this manner to determine what percentage of the active loans will transition into each delinquency state during each time period (e.g., next 30, 60, 90 . . . days etc.).

Based on the above determinations, the processing device 117 may then determine the percentage of active loans that will ultimately transition into the 180 DNP delinquency state during the time the active loans are on book, and determine a first component of the estimated portfolio loss based on the dollar value of the active loans that are predicted to transition into the 180 DNP delinquency state. As discussed above, in some embodiments the processing device 117 may perform the above steps for each monthly origination cohort and determine the percentage of active loans that will ultimately transition into the 180 DNP delinquency state during the time the active loans are on book for each monthly origination cohort.

The loan portfolio data 116 may also comprise portfolio migration data 116D corresponding to loans for consumers who have migrated to a different account type (referred to herein as "platform migrations"). For each monthly origination cohort in the portfolio migration data 116D, the processing device 117 (executing loss forecasting module 116C) may assume that 100% of the remaining principal outstanding will be charged off on the days on book of the cohort as of current date, or 420 days on book, whichever occurs later. As shown in FIG. 2, the loss resulting from platform migrations may correspond to the second component of the estimated portfolio loss.

Figure 8:
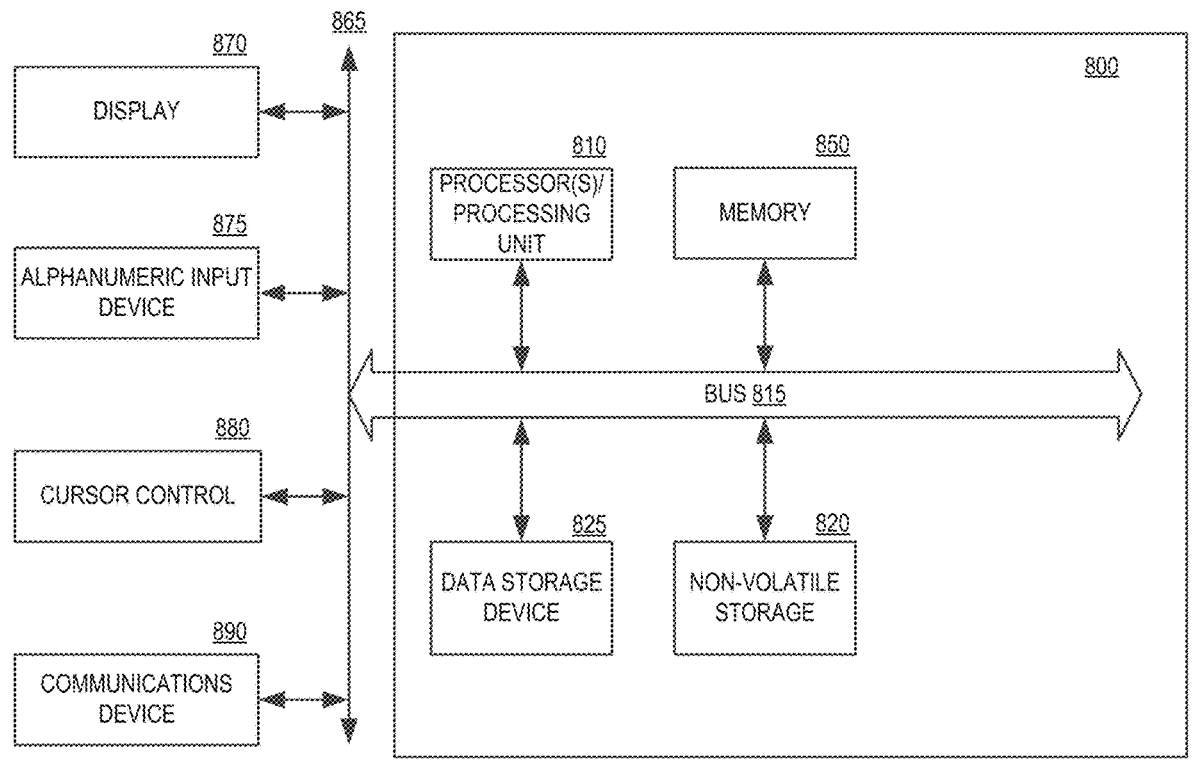
FIG. 8 is a block diagram of a computing device which may perform the methods and techniques for providing and implementing a machine learning loan portfolio loss forecasting system, in accordance with some embodiments of the present disclosure.

FIG. 8 is one embodiment of a computer system 800 that may be used to support the systems and operations discussed herein. It will be apparent to those of ordinary skill in the art, however that other alternative systems of various system architectures may also be used.

The data processing system illustrated in FIG. 8 includes a bus or other internal communication means 815 for communicating information, and a processor 810 coupled to the bus 815 for processing information. The system further comprises a random access memory (RAM) or other volatile storage device 850 (referred to as memory), coupled to bus 815 for storing information and instructions to be executed by processor 810. Main memory 850 also may be used for storing temporary variables or other intermediate information during execution of instructions by processor 810. The system also comprises a read only memory (ROM) and/or static storage device 820 coupled to bus 815 for storing static information and instructions for processor 810, and a data storage device 825 such as a magnetic disk or optical disk and its corresponding disk drive. Data storage device 825 is coupled to bus 815 for storing information and instructions.

The system may further be coupled to a display device 870, such as a light emitting diode (LED) display or a liquid crystal display (LCD) coupled to bus 815 through bus 865 for displaying information to a computer user. An alphanumeric input device 875, including alphanumeric and other keys, may also be coupled to bus 815 through bus 865 for communicating information and command selections to processor 810. An additional user input device is cursor control device 880, such as a touchpad, mouse, a trackball, stylus, or cursor direction keys coupled to bus 815 through bus 865 for communicating direction information and command selections to processor 810, and for controlling cursor movement on display device 870.

Another device, which may optionally be coupled to computer system 800, is a communication device 890 for accessing other nodes of a distributed system via a network. The communication device 890 may include any of a number of commercially available networking peripheral devices such as those used for coupling to an Ethernet, token ring, Internet, or wide area network. The communication device 890 may further be a null-modem connection, or any other mechanism that provides connectivity between the computer system 800 and the outside world. Note that any or all of the components of this system illustrated in FIG. 8 and associated hardware may be used in various embodiments as discussed herein.

It will be appreciated by those of ordinary skill in the art that any configuration of the system may be used for various purposes according to the particular implementation. The control logic or software implementing the described embodiments can be stored in main memory 850, mass storage device 825, or other storage medium locally or remotely accessible to processor 810.

It will be apparent to those of ordinary skill in the art that the system, method, and process described herein can be implemented as software stored in main memory 850 or read only memory 820 and executed by processor 810. This control logic or software may also be resident on an article of manufacture comprising a computer readable medium having computer readable program code embodied therein and being readable by the mass storage device 825 and for causing the processor 810 to operate in accordance with the methods and teachings herein.

The embodiments discussed herein may also be embodied in a handheld or portable device containing a subset of the computer hardware components described above. For example, the handheld device may be configured to contain only the bus 815, the processor 810, and memory 850 and/or 825. The handheld device may also be configured to include a set of buttons or input signaling components with which a user may select from a set of available options. The handheld device may also be configured to include an output apparatus such as a liquid crystal display (LCD) or display element matrix for displaying information to a user of the handheld device. Conventional methods may be used to implement such a handheld device. The implementation of embodiments for such a device would be apparent to one of ordinary skill in the art given the disclosure as provided herein.

The embodiments discussed herein may also be embodied in a special purpose appliance including a subset of the computer hardware components described above. For example, the appliance may include a processor 810, a data storage device 825, a bus 815, and memory 850, and only rudimentary communications mechanisms, such as a small touch-screen that permits the user to communicate in a basic manner with the device. In general, the more special-purpose the device is, the fewer of the elements need be present for the device to function.

It is to be understood that the above description is intended to be illustrative, and not restrictive. Many other embodiments will be apparent to those of skill in the art upon reading and understanding the above description. The scope should, therefore, be determined with reference to the appended claims, along with the full scope of equivalents to which such claims are entitled.

The foregoing description, for purpose of explanation, has been described with reference to specific embodiments. However, the illustrative discussions above are not intended to be exhaustive or to limit the described embodiments to the precise forms disclosed. Many modifications and variations are possible in view of the above teachings. The embodiments were chosen and described in order to best explain the principles and practical applications of the various embodiments, to thereby enable others skilled in the art to best utilize the various embodiments with various modifications as may be suited to the particular use contemplated.

What is claimed is:

1. A computer-implemented method comprising:
   monitoring, by a processing device of a server computer system, estimated losses attributable to a set of services offered by a user system;
   generating, by the processing device of the server computer system, a set of estimated losses associated with the set of services offered by the user system, comprising:
      generating, by the processing device of the server computer system, a first machine learning model (MLM) input comprising a current state of a set of active services of a service portfolio during a first time period of a set of time periods;
      generating, by the processing device of the server computer system, a second MLM input comprising, for each time period of the set of time periods, a roll rate of a set of non-active services from each delinquency state to a subsequent delinquency state;
      combining, by an MLM implemented by the processing device of the server computer system, the first MLM input and the second MLM input to generate:
         a percentage of the active services that will transition to each of the set of delinquency states during a subsequent time period, and
         the roll rate from each current delinquency state to the subsequent delinquency state for the subsequent time period; and
      generating, by the processing device of the server computer system, a data structure comprising the estimated loss of the service portfolio based at least in part on: a percentage of the active services that will transition to a delinquency state corresponding to a final delinquency state during one time period of the set of time periods, and an estimated loss from a platform migration service portfolio;
   in response to satisfaction of a loss criteria, generating, by the processing device of the server computer system, an instruction indicating an adjustment to reserves maintained by the user system for service offerings of the user system; and
   transmitting, from the server computer system to the user system, the instruction causing the user system to perform the adjustment to the reserves maintained.

2. The computer-implemented method of claim 1, wherein a time period for which the percentage of active services that will transition to the set of delinquency states corresponds to a current state of the time period.

3. The computer-implemented method of claim 1, further comprising:
   calibrating each of the generated roll rates for one or more of the set of time periods by using a multiplier to account for elevated delinquency and loss expectation due to outside factors.

4. The computer-implemented method of claim 1, further comprising:
   representing the generated roll rates for each of the set of time periods as a roll rate transition matrix.

5. The computer-implemented method of claim 1, further comprising:
   outputting the data structure indicating the estimated losses of the service portfolio to a storage system.

6. The computer-implemented method of claim 5, further comprising:
   adjusting a reserve based on the data structure indicating the estimated losses of the service portfolio.

7. The computer-implemented method of claim 1, wherein the estimated losses are further based on estimated losses from the platform migration service portfolio.

8. A system comprising:
   a memory; and
   a processing device coupled with the memory, the processing device configured to:
   monitor estimated losses attributable to a set of services offered by a user system;
   generate a set of estimated losses associated with the set of services offered by the user system, comprising:
      generate a first machine learning model (MLM) input comprising a current state of a set of active services of a service portfolio during a first time period of a set of time periods;
      generate a second MLM input comprising, for each time period of the set of time periods, a roll rate of a set of non-active services from each delinquency state to a subsequent delinquency state;
      combine, by an MLM, the first MLM input and the second MLM input to generate:
         a percentage of the active services that will transition to each of the set of delinquency states during a subsequent time period, and
         the roll rate from each current delinquency state to the subsequent delinquency state for the subsequent time period; and
      generate a data structure comprising the estimated losses of the service portfolio based at least in part on: a percentage of the active services that will transition to a delinquency state corresponding to a final delinquency state during one time period of the set of time periods, and an estimated loss from a platform migration service portfolio;
   in response to satisfaction of a loss criteria, generate an instruction indicating an adjustment to the reserves maintained by the user system for service offerings of the user system; and
   transmit, to the user system, the instruction causing the user system to perform the adjustment to reserves maintained.

9. The system of claim 8, wherein a time period for which the percentage of active services that will transition to the set of delinquency states corresponds to a current state of the time period.

10. The system of claim 8, wherein the processing device is further to:

calibrate each of the generated roll rates for one or more of the set of time periods by using a multiplier to account for elevated delinquency and loss expectation due to outside factors.

11. The system of claim 8, wherein the processing device is further to:
represent the generated roll rates for each of the set of time periods as a roll rate transition matrix.

12. The system of claim 8, wherein the processing device is further to:
determine estimated losses of the service portfolio based on the percentage of the active services that will transition to a delinquency state corresponding to a charge-off during one of the set of time periods; and
output the data structure indicating the estimated losses of the service portfolio to a storage system.

13. The system of claim 12, wherein the processing device is further to:
adjust a reserve based on the data structure indicating the estimated losses of the service portfolio.

14. The system of claim 8, wherein the estimated losses are further based on estimated losses from the platform migration service portfolio.

15. A non-transitory computer-readable medium having instructions stored thereon which, when executed by a processing device, cause the processing device to:
monitor estimated losses attributable to a set of services offered by a user system;
generate a set of estimated losses associated with the set of services offered by the user system, comprising:
generate a first machine learning model (MLM) input comprising a current state of a set of active services of a service portfolio during a first time period of a set of time periods;
generate a second MLM input comprising, for each time period of the set of time periods, a roll rate of a set of non-active services from each delinquency state to a subsequent delinquency state;
combine, by an MLM, the first MLM input and the second MLM input to generate:
a percentage of the active services that will transition to each of the set of delinquency states during a subsequent time period, and
the roll rate from each current delinquency state to the subsequent delinquency state for the subsequent time period; and
generate a data structure comprising the estimated losses of the service portfolio based at least in part on: a percentage of the active services that will transition to a delinquency state corresponding to a final delinquency state during one time period of the set of time periods, and estimated losses from a platform migration service portfolio;
in response to satisfaction of a loss criteria, generate an instruction indicating an adjustment to the reserves maintained by the user system for service offerings of the user system; and
transmit, to the user system, the instruction causing the user system to perform the adjustment to reserves maintained.

16. The non-transitory computer-readable medium of claim 15, wherein a time period for which the percentage of active services that will transition to the set of delinquency states corresponds to a current state of the time period.

17. The non-transitory computer-readable medium of claim 15, wherein the instructions further cause the processing device to:
calibrate each of the generated roll rates for one or more of the set of time periods by using a multiplier to account for elevated delinquency and loss expectation due to outside factors.

18. The non-transitory computer-readable medium of claim 15, wherein the instructions further cause the processing device to:
represent the generated roll rates for each of the set of time periods as a roll rate transition matrix.

19. The non-transitory computer-readable medium of claim 15, wherein the instructions further cause the processing device to:
output the data structure indicating the estimated losses of the service portfolio to a storage system.

20. The non-transitory computer-readable medium of claim 19, wherein the instructions further cause the processing device to:
adjust a reserve based on the data structure indicating the estimated losses of the service portfolio.

* * * * *